(12) United States Patent
Mallmann et al.

(10) Patent No.: US 10,006,511 B2
(45) Date of Patent: Jun. 26, 2018

(54) BRAKE LINING ASSEMBLY FOR A VEHICLE BRAKE

(75) Inventors: Markus Mallmann, Pfalzfeld (DE); Peter Stahl, Bad Neuenahr-Ahrweiler (DE); Wolfgang Rüdell, Brey (DE)

(73) Assignee: Lucas Automotive GmbH, Koblenz (DE)

( * ) Notice: Subject to any disclaimer, the term of this patent is extended or adjusted under 35 U.S.C. 154(b) by 14 days.

(21) Appl. No.: 14/241,566

(22) PCT Filed: Aug. 22, 2012

(86) PCT No.: PCT/EP2012/003568
§ 371 (c)(1),
(2), (4) Date: Jun. 9, 2014

(87) PCT Pub. No.: WO2013/029765
PCT Pub. Date: Mar. 7, 2013

(65) Prior Publication Data
US 2014/0291082 A1    Oct. 2, 2014

(30) Foreign Application Priority Data

Sep. 1, 2011    (DE) .................. 10 2011 112 247

(51) Int. Cl.
F16D 65/097    (2006.01)
F16D 65/00    (2006.01)
(Continued)

(52) U.S. Cl.
CPC ....... *F16D 65/0006* (2013.01); *F16D 65/092* (2013.01); *F16D 65/0971* (2013.01);
(Continued)

(58) Field of Classification Search
CPC ............. F16D 65/0972; F16D 65/0973; F16D 65/0974; F16D 65/0977; F16D 65/0978;
(Continued)

(56) References Cited

U.S. PATENT DOCUMENTS 3,638,765 A    2/1972    Flaherty et al.
3,977,499 A    8/1976    Johannesen
(Continued)

FOREIGN PATENT DOCUMENTS

DE    19602037 A1    7/1997
DE    102006052178 A1    6/2007
(Continued)

OTHER PUBLICATIONS

Delon et al (FR 2969238), Translation.*
International Search Report for case No. PCT/EP2012/003568 dated Feb. 27, 2013.

*Primary Examiner* — Bradley T King
*Assistant Examiner* — Stephen M Bowes
(74) *Attorney, Agent, or Firm* — MacMillan, Sobanski & Todd, LLC (57) ABSTRACT

A brake pad arrangement for a vehicle brake, having a frictional pad, a pad back plate and a damping plate that is arranged on the pad back plate, the brake pad arrangement having a separate damping element which is provided in order to avoid frictional vibrations of the brake pad arrangement.

14 Claims, 9 Drawing Sheets

(51) Int. Cl.
*F16D 66/02* (2006.01)
*F16D 65/092* (2006.01)

(52) U.S. Cl.
CPC ..... *F16D 65/0972* (2013.01); *F16D 65/0978* (2013.01); *F16D 66/02* (2013.01)

(58) Field of Classification Search
CPC ......... F16D 2055/0041; F16D 65/0979; F16D 65/0006
See application file for complete search history.

(56) References Cited

U.S. PATENT DOCUMENTS

| | | | |
|---|---|---|---|
| 4,460,067 A * | 7/1984 | Katagiri | F16D 66/02 |
| | | | 188/1.11 W |
| 4,498,559 A | 2/1985 | Katagiri et al. | |
| 6,056,091 A | 5/2000 | Krug et al. | |
| 7,318,503 B2 * | 1/2008 | Farooq | F16D 65/0974 |
| | | | 188/205 A |
| 8,097,329 B2 | 1/2012 | Koshizuka | |
| 8,973,719 B2 * | 3/2015 | Rossignol | F16D 65/095 |
| | | | 188/73.31 |
| 2005/0067235 A1 | 3/2005 | Pham et al. | |
| 2011/0056778 A1 * | 3/2011 | Roth | F16D 65/0973 |
| | | | 188/234 |

FOREIGN PATENT DOCUMENTS

| | | | | |
|---|---|---|---|---|
| DE | 102009006285 A1 | | 7/2010 | |
| FR | 2969238 A1 * | | 6/2012 | ......... F16D 65/0972 |
| GB | 2109065 A | | 5/1983 | |
| JP | 11-325133 | | 11/1999 | |
| JP | 4258532 B2 | | 4/2009 | |
| JP | 2011017371 A | | 1/2011 | |

* cited by examiner

BRAKE LINING ASSEMBLY FOR A VEHICLE BRAKE

CROSS-REFERENCE TO RELATED APPLICATIONS

This application is a national stage of International Application No. PCT/EP2012/003568 filed Aug. 22, 2012, the disclosures of which are incorporated herein by reference in entirety, and which claimed priority to German Patent Application No. DE 10 2011 112 247.1 filed Sep. 1, 2011, the disclosures of which are incorporated herein by reference in entirety.

BACKGROUND OF THE INVENTION

The present invention relates to a brake pad arrangement for a vehicle brake having a brake pad or friction pad, a pad back plate and a damping plate which is arranged on the pad back plate.

Brake pad arrangements of this type are known from the prior art and disclosed, for example, in German laid-open applications DE 196 02 037 A1, and corresponding U.S. Pat. No. 6,056,091, both of which are incorporated by reference herein in entirety, or DE 10 2006 052 178 A1. The brake pad arrangement described in the prior art has a pad back plate, a friction pad being arranged on one side of the pad back plate and a damping plate being arranged on the opposite side. The damping plate is produced from thin sheet metal and further comprises laterally projecting extensions which, after attachment to the pad back plate, are laterally bent round at right angles bearing against the latter, in order to increase the damping effect of the damping plate. In the installed position of the brake pad arrangement, these extensions bear against an associated portion of the brake carrier of a vehicle brake, in order to create a damping intermediate layer there too.

The damping plate and the associated extensions are provided to suppress or damp frictional vibrations occurring in a disc brake which may result in noise emissions generally known as "squeal". The disadvantage of brake pad arrangements of this type lies in the fact that the attachment to, and the ensuing deformation of the extensions of the damping plate on, the pad back plate involve high outlay. Moreover, on producing the damping plate, by for example stamping, a relatively large amount of scrap arises owing to the fact that the damping plate including the extensions is of one piece. A further disadvantage lies in the fact that with different-size disc brakes the extensions on the damping plate likewise have to be formed differently, resulting in further, considerable outlay for modification.

BRIEF SUMMARY OF THE INVENTION

A feature of the present invention is to provide a brake pad arrangement of the type described at the outset which can be used with different-size disc brakes and nevertheless contribute to reducing the production costs.

This feature is achieved with a brake pad arrangement of the type described at the outset in which the brake pad arrangement has a separate damping element which is provided for avoiding frictional vibrations on the brake pad arrangement.

The separate damping element of the brake pad arrangement according to the invention is shaped in such a manner that it can bear against the pad back plate, in order to produce a damping effect when frictional vibrations occur.

As a result, it is possible to dispense with the extensions of the damping plate described in the prior art. The separate damping element affords the advantage that it can be easily attached to or pushed onto the pad back plate and is independent of the size of the damping plate of the brake pad arrangement. Thus, starting from the damping plate and the separate damping element, an optimal damping effect can be produced and the uniformly produced, separate damping element can be arranged on the brake pad arrangement or on the pad back plate irrespective of the size of the pad back plate or the damping plate.

Preferably, at least a part of the damping element bears in a manner free from play against the pad back plate, in order to achieve a damping effect. In this regard, it is advantageous when a plurality of bearing surfaces bear against the pad back plate, since the frictional vibrations can thereby be damped to an increased degree.

A preferred embodiment of the invention provides that the damping element is laterally arranged on or pushed onto the pad back plate. Furthermore, the damping element can be of u-shaped form, so that the limbs of the u-shaped damping element laterally embrace the pad back plate, in order to achieve a greater contact surface or bearing surface and thus an improved damping. Preferably, also at least a part of the damping element bears in a manner free from play against the side cheek of the pad back plate, in order to produce a damping effect. This intermediate region of the damping element can be formed as elasticity, i.e. exhibit a material-inherent spring action and serve as supporting or retaining force.

The connection between the damping element and the pad back plate can be produced via a latching connection, an adhesive-bonding connection and/or with the aid of a biasing force. Preferably, the connection is releasable. A connection is provided to prevent a slipping or displacement of the damping element on the pad back plate, in particular in the longitudinal and/or transverse direction of the damping element relative to the pad back plate.

For a connection of this type, there is provided a fixing element which can be engaged with the pad back plate, the fixing element being able to act on the front side, rear side and/or laterally on the pad back plate. Preferably, the fixing element is engaged with an extension of the pad back plate, which extension is provided to guide the brake pad arrangement in the vehicle brake.

In a preferred embodiment, the fixing element is elastically deformable in such manner that, as it is being pushed onto the pad back plate, it can produce, owing to elastic deformation, a clamping force which produces a connection between the damping element and the pad back plate owing to the pressing-on force. Preferably, two or more fixing elements are situated on the damping element to fasten the latter securely to the pad back plate, in order to produce a damping effect. Fixing elements of this type preferably come in pairs, in particular oppositely, on the damping element. These two fixing elements can be situated in a plane, for example in a plane parallel to the pad back plate. Furthermore, experience shows that the action of the fixing elements on the extension of the pad back plate is possible, in order to fasten the damping element to the pad back plate. A fixing element can be an arm which projects from the damping element and can produce a clamping force by elastic deformation.

In a further embodiment, the fixing element can have at least one latching element which is engageable with a corresponding recess or a corresponding undercut. In this regard, there are provided any type of latching devices known from the prior art which can produce a connection, in particular a pressing of a surface of the damping element against the pad back plate. In this regard, the recess or the undercut can also be situated on the damping element and the corresponding latching element on the pad back plate.

Furthermore, the fixing element can have an aperture or a cutout or an engaging limb which are engageable with a corresponding positioning projection on the pad back plate. The aperture can be elongate or oval, and also be helpful during the positioning of the damping element on the pad back plate. The positioning projection can be configured in the form of a positioning bulge or in the form of a positioning pin.

A supporting arm can project from the damping element, which arm supports and/or radially outwardly biases the brake pad arrangement with respect to a brake carrier of the vehicle brake. Preferably, this supporting arm of the damping element is arranged on the extension of the pad carrier plate which guides the brake pad arrangement with respect to the brake carrier of the vehicle brake. Thus, a damping effect can be further increased. On a supporting arm of this type there can be arranged a fixing element of the above-described type which fixes the damping element on the pad back plate.

Likewise, the damping element can be biased in a state attached to the pad back plate, the damping element being received under vibration-reducing biasing on installation in a brake carrier.

The friction pad becomes worn as a result of coming into contact with the disc brake of the vehicle brake during the braking process. In the case of a worn friction pad, there is the danger of the disc brake touching the part of the damping element bearing against the side facing the friction pad. The damping element can have a portion or a protruding arm which is arranged on the side facing the friction pad and is directed in the direction of the brake disc. When the wear limit of the friction pad is reached, the portion or the arm can strike or contact the brake disc of the vehicle brake. In doing so, a warning noise can be produced indicating a wear of the friction pad before the latter is completely worn.

The damping element according to the invention preferably consists of a shaped body which is in particular formed of one part and is bent from sheet metal. Producing the damping element from plastic by means of an injection-moulding process is likewise possible, this enabling not only an improved damping behaviour, but also cost-effective manufacture. Preferably, the damping element is pushed onto the extension projecting laterally from the pad back plate. The position of the damping element is predetermined by such pushing-on. A fixing element can secure the damping element against a radial movement of the damping element or against slipping-down of the damping element from the extension of the pad back plate.

In a preferred embodiment, an additional damping material is situated between the damping element and the pad back plate. Preferably, the damping material is an adhesive layer or an adherent foam which is provided for damping owing to elastic properties and for fastening the damping element on the pad back plate. Preferably, the additional damping material is situated at the contact place or at the contact surfaces between the damping element and the pad back plate. Furthermore, other materials which have a damping effect or a material-inherent spring action are conceivable.

The present invention further relates to a disc brake for a vehicle system having a brake disc and the brake pad arrangement according to the invention. The brake pad arrangement, in particular the friction pad, is provided to act on the brake disc in order to produce a braking effect. In this regard, the brake pad arrangement is moved relative to the brake disc, as already known many times from the prior art.

Other advantages of this invention will become apparent to those skilled in the at from the following detailed description of the preferred embodiments, when read in light of the accompanying drawings.

DETAILED DESCRIPTION OF THE INVENTION

Figure 1:
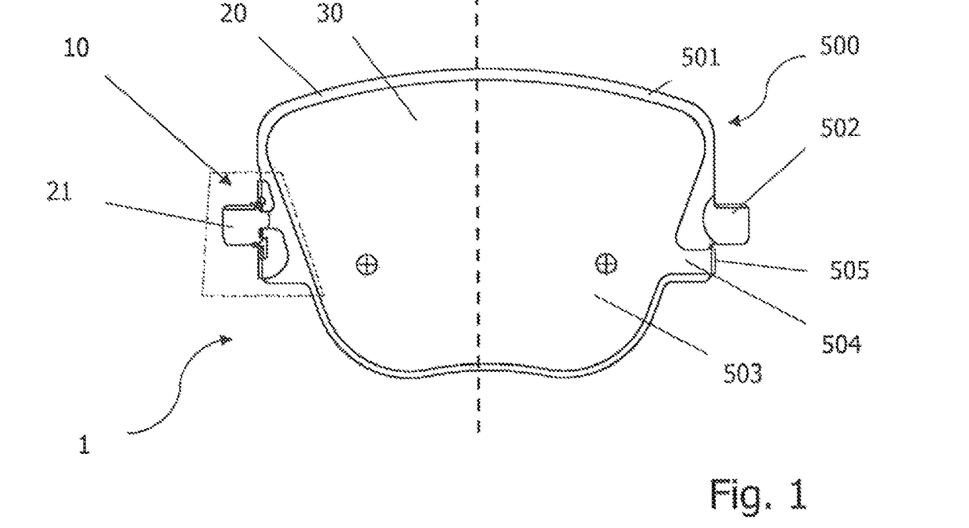
FIG. 1 shows a front view of a brake pad arrangement, the brake pad arrangement according to the invention being compared, by a dashed line, with the prior art.

FIG. 1 shows a front view of a brake pad arrangement, the brake pad arrangement 500 of the prior art being compared with the brake pad arrangement 1 having the damping element 10 according to the invention. The brake pad arrangement 500 shown in the prior art has a pad back plate 501 with a laterally projecting extension 502, the pad back plate 501 being largely covered by a damping plate 503. The damping plate 503 has an extension 504 which is illustrated in a position engaging around the pad back plate 501. In this position, the portion 505 of the extension 504 bears against the side cheek of the pad back plate 501. The left-hand side of the brake pad arrangement 1 illustrated in FIG. 1, which shows the damping element 10 according to the invention, has a pad back plate 20 with a laterally projecting extension 21. The damping element 10 according to the invention is pushed onto this extension 21. The pad back plate 20 is largely covered by a damping plate 30.

Figure 2:
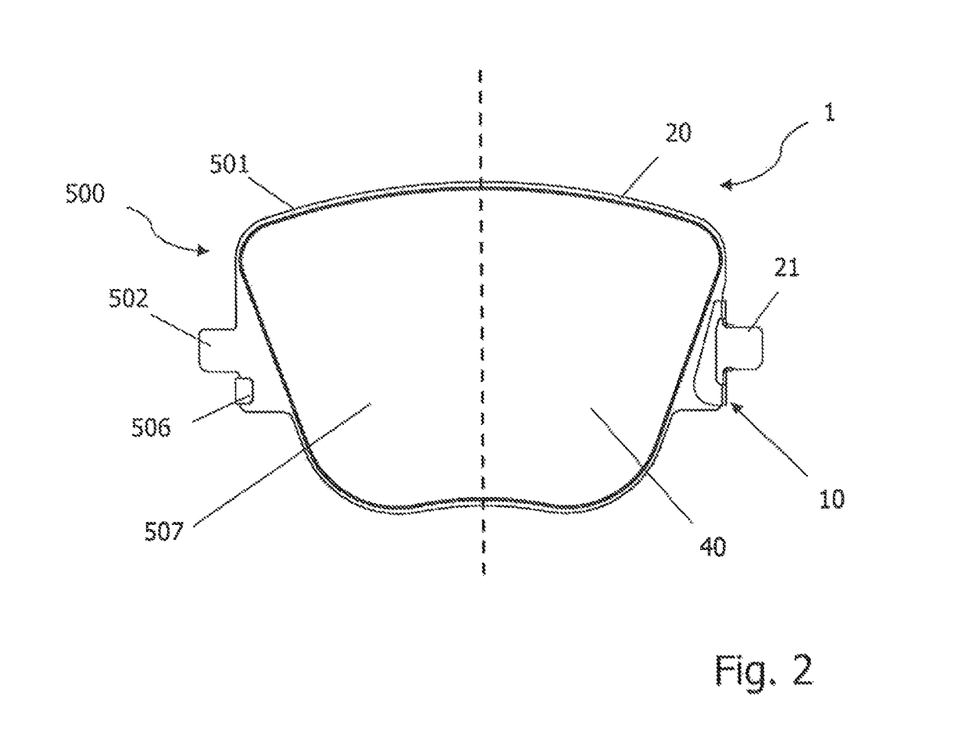
FIG. 2 shows a rear view of the brake pad arrangement, the brake pad arrangement according to the invention being compared, by a dashed line, with the prior art.

FIG. 2 shows a rear view of the brake pad arrangement, the prior art again being compared with the brake pad arrangement 1 having the damping element according to the invention. The brake pad arrangement 500 shown in the prior art shows a friction pad 507 which largely covers the pad back plate 501. Furthermore, the distal end of the extension 504 is illustrated as a bearing surface 506 which engages around the pad back plate 501. Situated on the right-hand side of the brake pad arrangement illustrated in FIG. 2 is the damping element 10 according to the invention which is pushed onto the extension 21. Furthermore, a friction pad 40 which largely covers the pad back plate 20 is illustrated.

Figure 3A:
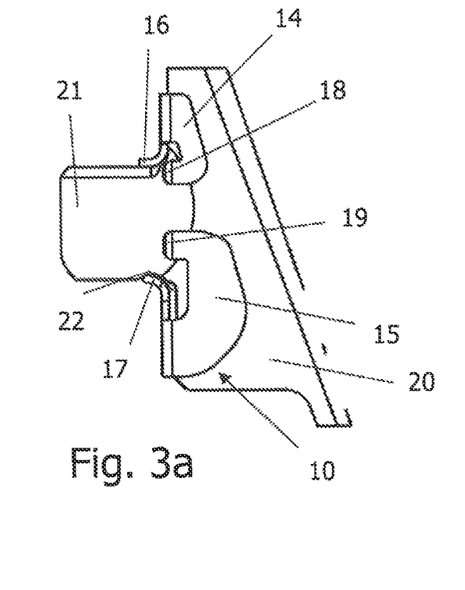
FIG. 3a shows a front view of the damping element according to the invention in the installed position.
Figure 3B:
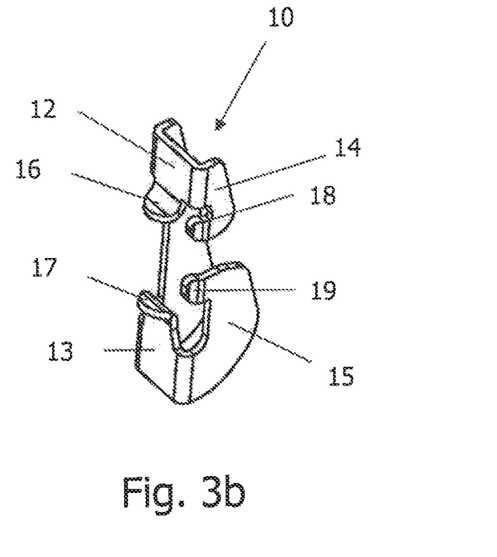
FIGS. 3b-3d show different perspective view of the damping element.
Figure 3C:
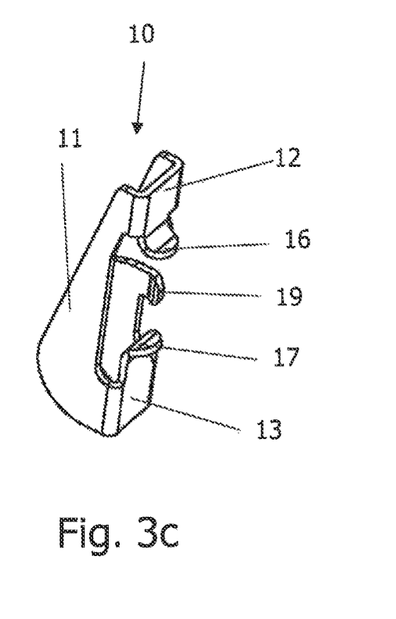
Figure 3D:
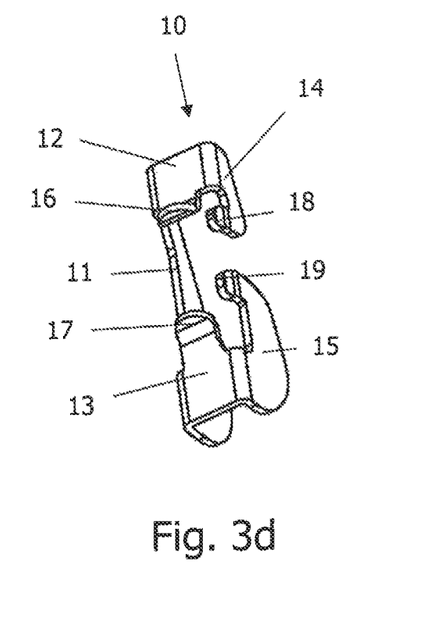

FIGS. 3a-d show the damping element 10 according to the invention. In FIG. 3a, the damping element 10 is illustrated in the installed position, the damping element 10 being pushed onto the extension 21 of the pad back plate 20. The damping element 10 consists of a shaped body which is preferably shaped from sheet metal. The damping element 10 is of u-shaped configuration, the two limbs of the u-shaped damping element projecting at right angles from the intermediate connecting piece in such a manner that the limbs are oppositely arranged. The damping element 10 is formed to engage around the pad back plate 20 laterally, so that all the inner surfaces of the damping element 10 bear against the pad back plate 20.

That limb of the u-shaped damping element 10 which is arranged, in the installed state, on the side facing the friction pad 40 has a bearing surface which extends over the entire component length. The bearing surface 11 is formed as a triangular surface and tapers accordingly towards the upper end of the damping element 10. The bearing surface 11 bears in a manner free from play against the pad back plate 20, in order to produce a damping effect.

That limb of the damping element 10 which is arranged opposite the bearing surface 11 and is arranged on the side facing the damping plate 30 has an upper holding region 14 and a lower holding region 15 which is or are arranged in the same plane, opposite and/or spaced from one another. The outline of the holding regions 14, 15 corresponds to the outline of the oppositely arranged bearing surface 11. Owing to the tapering shape of the outline, the lower holding region 15 has a bearing surface at least twice as large as the upper holding region 14. Situated on the side facing in each case the other holding region 14 and 15, respectively, is a clamping lug 18 and 19, respectively, which projects from the respective holding region 14 and 15 and extends towards the connecting portion. The clamping lugs 18, 19 are biased towards the oppositely arranged bearing surface 11, so that they widen elastically when pushing the damping element 10 onto the pad back plate 20 and thereby produce a bias which fixes the damping element 10 on the pad back plate 20. The clamping lugs 18, 19 are provided in order to prevent the damping element 10 from exerting an axial movement relative to the pad back plate 20 in the installed state and in order to press the damping element 10 against the pad back plate 20 and thus produce a bearing surface which can produce a damping effect.

The connecting portion between the bearing surface 11 and the holding regions 14, 15 has an upper connecting portion 12 and a lower connecting portion 13 which are arranged spaced from one another. The clearance between the upper connecting portion 12 and the lower connecting portion 13 is provided to receive the extension 21 of the pad back plate 20 in the installed position. The upper holding region 14 projects at right angles from the upper connecting portion 12 and the lower holding region 15 projects at right angles from the lower connecting portion 14. Thus, the upper connecting portion 12 and the upper connecting region 14 are only connected to the lower connecting portion 13 and the lower holding region 15 via the bearing surface 11.

On the upper connecting portion 12, a fastening lug 16 projects substantially at right angles and in an outward direction, which fastening lug is provided to fix the damping element 10, in the installed position, on the extension 21 owing to elastic deformation of the fastening lug 16. On the lower connecting portion 13, a latching lug 17 projects likewise substantially at right angles and in an outward direction from the lower connecting portion 14. This latching lug 17 is provided to be situated, in the installed position, in engagement with an undercut 22 which is arranged on the extension 21 of the pad back plate 20. The undercut 22 has an entry slope, with the result that during the latching connection the damping element 10 is forced onto the pad back plate 20 in order to ensure freedom from play also in the transverse direction. This undercut 22 is arranged on the extension 21 in such a manner that the latching connection takes place only when the damping element is completely pushed onto the extension 21.

The fastening lug 16, the latching lug 17 and the clamping lugs 18, 19 are provided primarily to fix the damping element in a manner free from play on the pad back plate, in order to produce a damping effect owing to the bearing-on surfaces. Furthermore, these elements are intended to prevent a slipping or displacement of the damping element 10 relative to the pad back plate 20.

Damping material with a material-inherent spring action may be present between the damping element 10 and the pad back plate 20, in order to additionally increase the damping effect.

Figure 4:
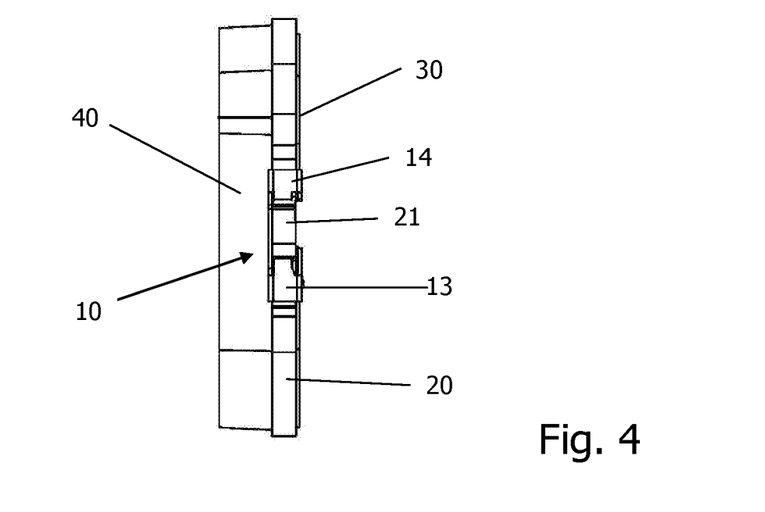
FIG. 4 shows a side view of the brake pad arrangement with the damping element.

FIG. 4 shows a side view, in which the damping element 10 is pushed onto the extension 21 of the pad back plate 20.

Figure 5:
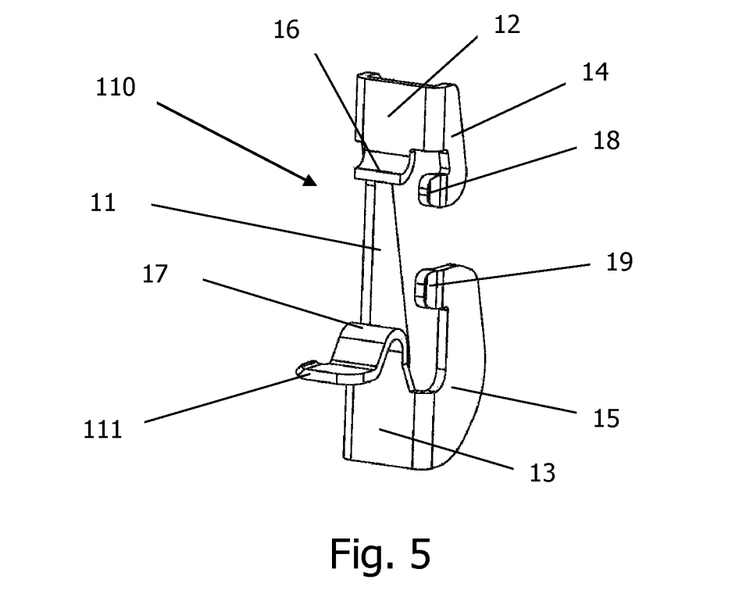
FIG. 5 shows a perspective view of a further embodiment of the damping element.
Figure 6:
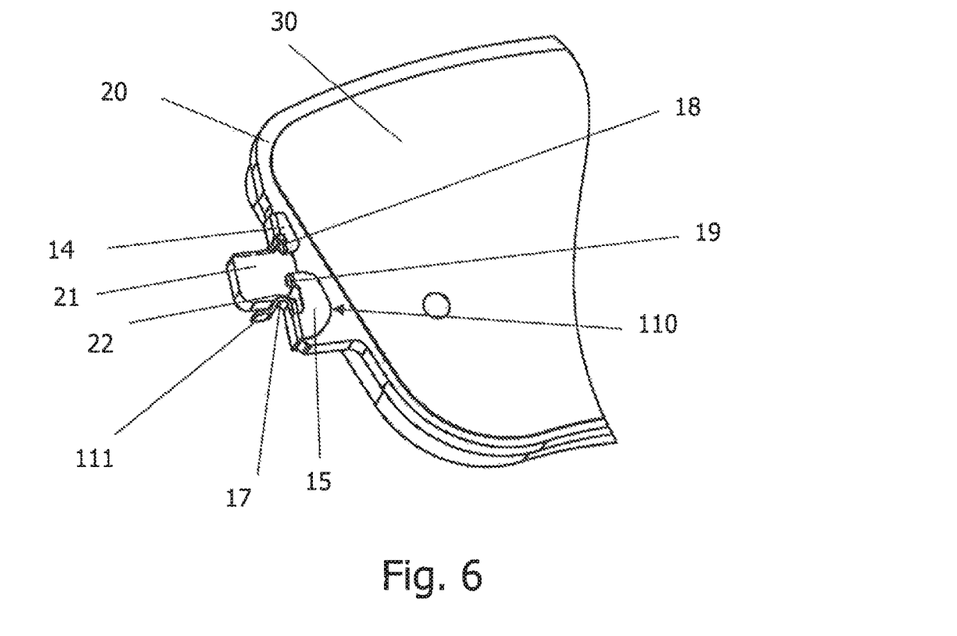
FIG. 6 shows a perspective view of the embodiment shown in FIG. 5.
Figure 7:
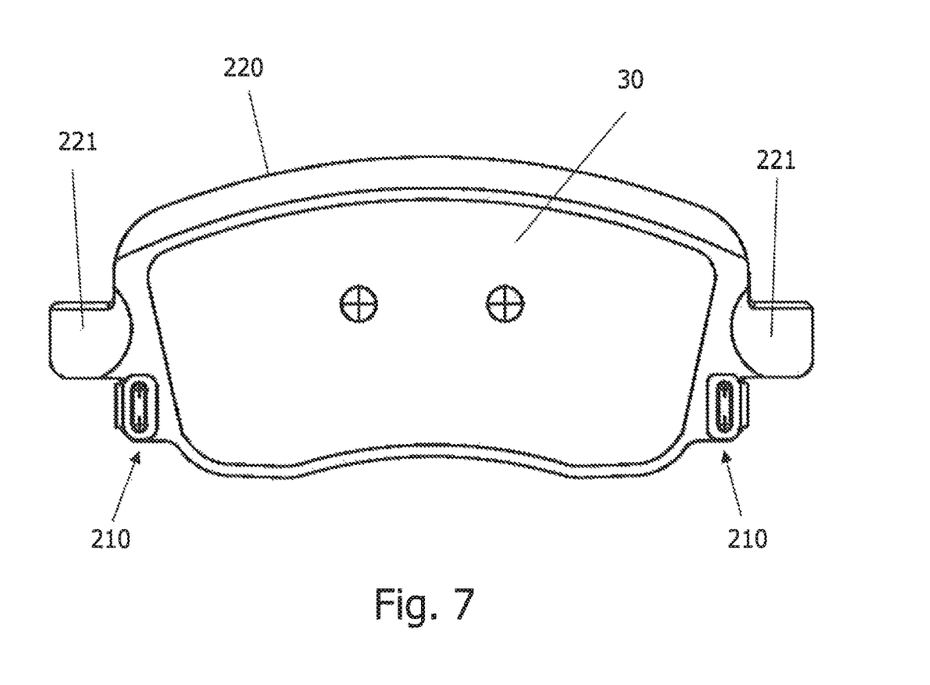
FIG. 7 shows a front view of a further embodiment of the brake pad arrangement.
Figure 8:
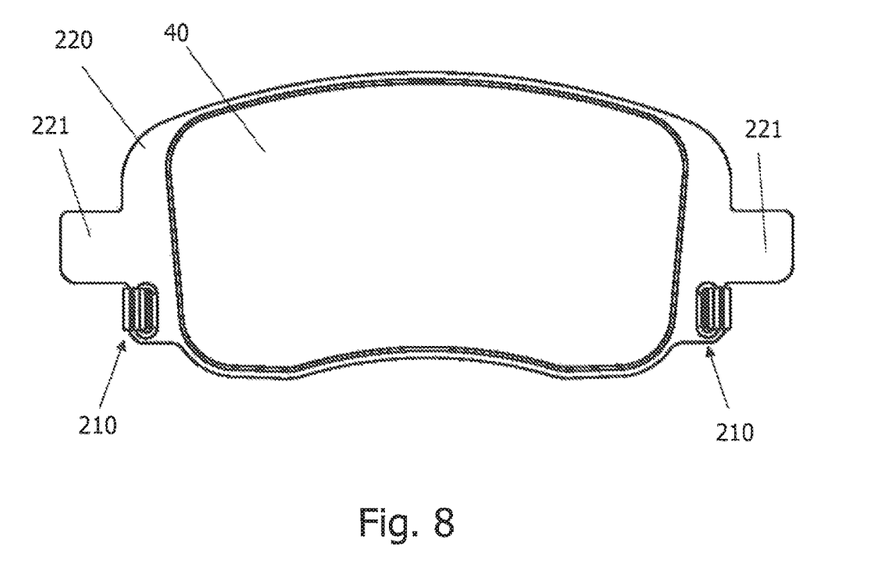
FIG. 8 shows a rear view of the embodiment of the brake pad arrangement shown in FIG. 7.
Figure 9:
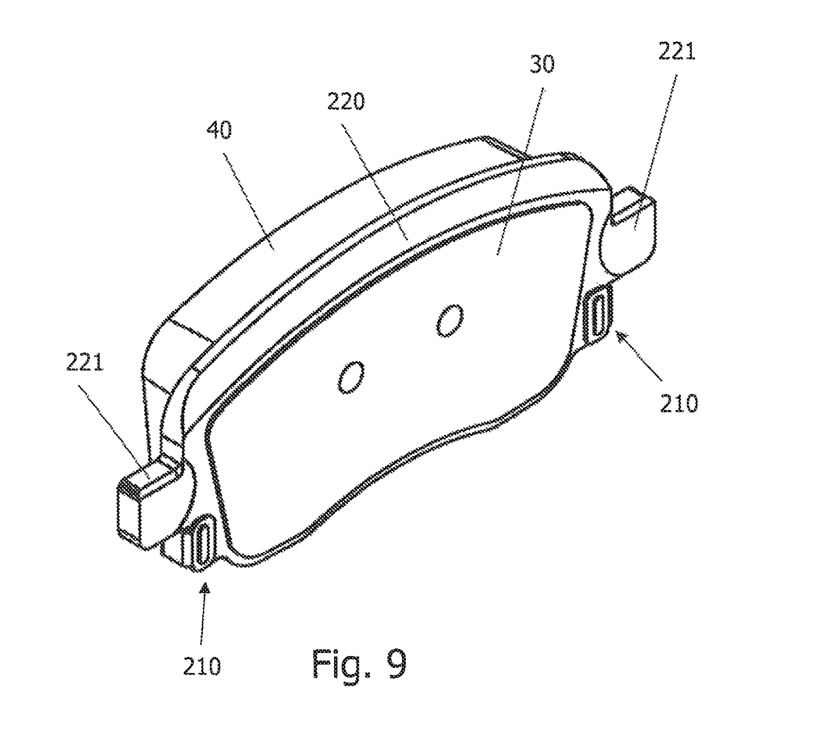
FIG. 9 shows a perspective view of the embodiment of the brake pad arrangement shown in FIG. 7.
Figure 10:
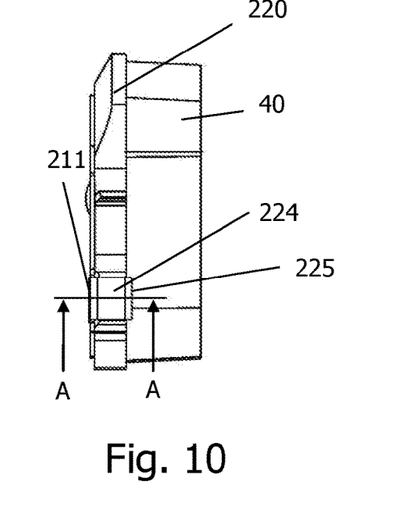
FIG. 10 shows a side view of the embodiment shown in FIG. 7.

FIGS. 5 and 6 show a further embodiment of the damping element. The only difference from the above-described damping element lies in the fact that, at the distal end of the latching lug 17 which projects from the lower connecting portion 13, there is arranged an additional supporting arm 111 which projects substantially at right angles from the lower connecting portion 13. The supporting arm 111 of the damping element 110 is supported on a brake carrier of a vehicle brake (not illustrated), in which the brake pad arrangement is installed. The lower surface of the supporting arm 111 is formed to bias the brake pad arrangement radially outwards. In doing so, vibrations can be additionally damped. All the other elements and functions of the damping element illustrated in FIGS. 5 and 6 correspond to the elements and functions described in FIGS. 1 to 4.

A further embodiment of the invention is depicted in FIGS. 7 to 12. In this embodiment, the damping element 210 is formed in the shape of a u-shaped clamp which laterally engages around the pad back plate 220. The extensions 221 of the pad back plate 220 are not embraced by the damping element 210, rather the damping element 210 engages around the pad back plate 220 below the extension 221. The u-shaped damping element 210 has a connecting portion or clamp portion 214 with two limbs projecting at right angles therefrom, in similar fashion to the preceding embodiments. The clamp portion 214 is provided to bias the two limbs inwards, so that these limbs firmly enclose the damping element 210 in the installed position or in a position pushed onto the damping element.

The one limb of the damping element 210 which is arranged on the side of the pad back plate 220 facing away from the friction pad 40 defines a plane, substantially oval bearing surface 211 with an aperture 212. The part of the pad back plate 220 on which the bearing surface 211 is arranged has a positioning bulge 222. The aperture 212 is formed in such a manner that the aperture 212 can be brought into engagement with the positioning bulge 222, as can best be seen in FIGS. 11 and 12a. This connection can be provided upon assembly for appropriate positioning of the damping element 210 on the pad back plate 220. Owing to the elongate configuration of the aperture 212 and the positioning bulge 222, correct longitudinal alignment of the damping element 210 on the pad back plate 220 is ensured.

Figure 11:
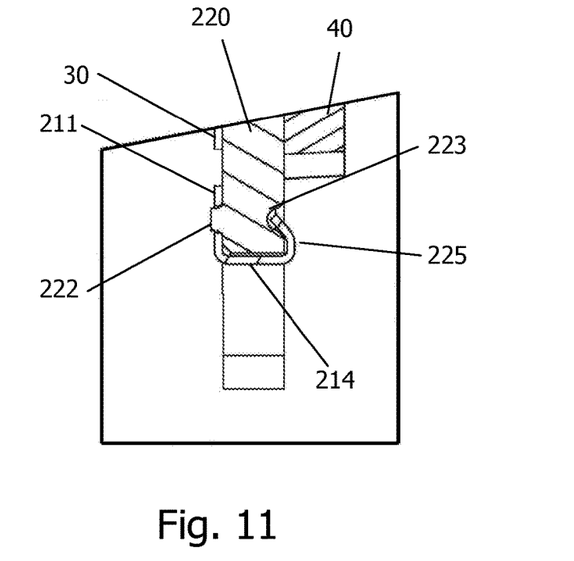
FIG. 11 shows an enlarged sectional view of the embodiment shown in FIG. 7 according to the section A-A shown in FIG. 10.
Figure 12A:
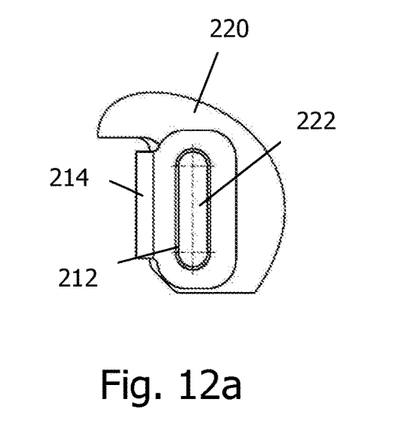
FIG. 12a shows an enlarged front view of the damping element in the installed position of the embodiment shown in FIG. 7.
Figure 12B:
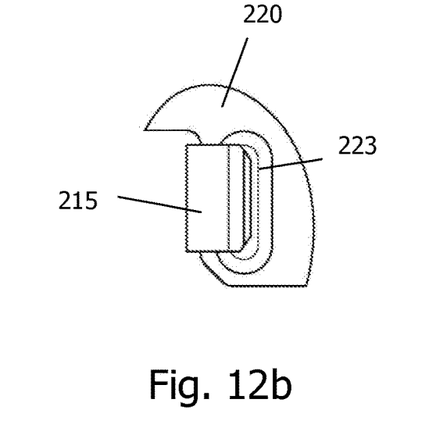
FIG. 12b shows an enlarged rear view of the damping element in the installed position of the embodiment shown in FIG. 7.
Figure 13:
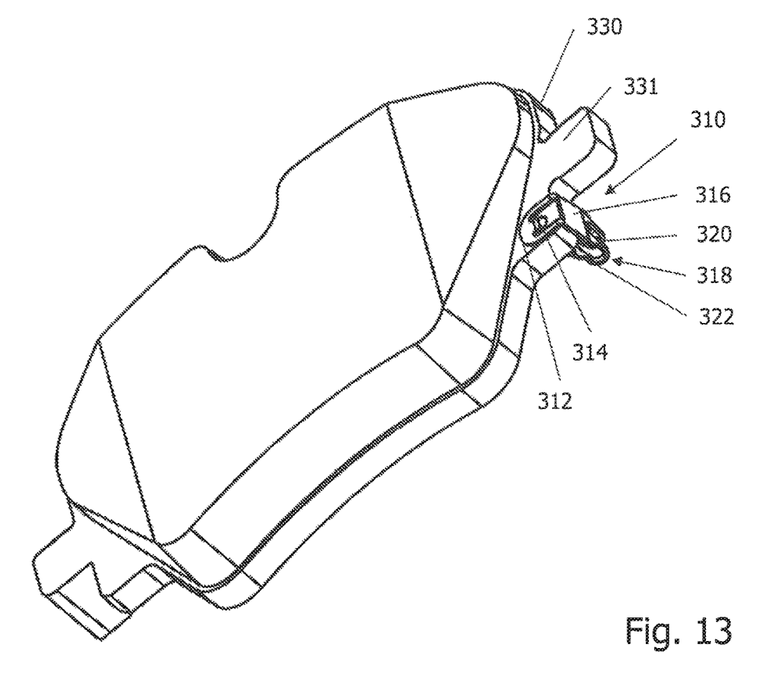
FIG. 13 shows a perspective view of the pad back plate with attached damping element according to a further embodiment.
Figure 14:
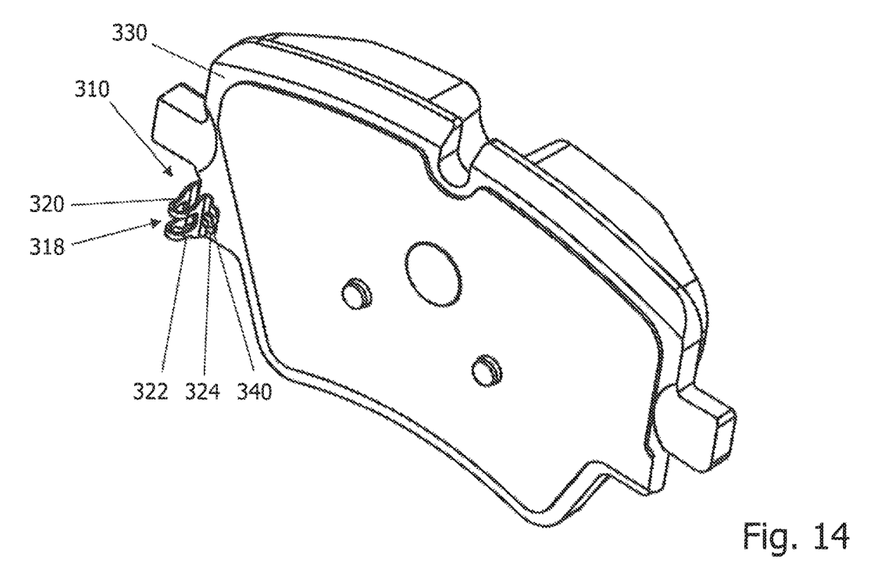
FIG. 14 shows a further perspective view of the pad back plate with the embodiment shown in FIG. 13.
Figure 15:
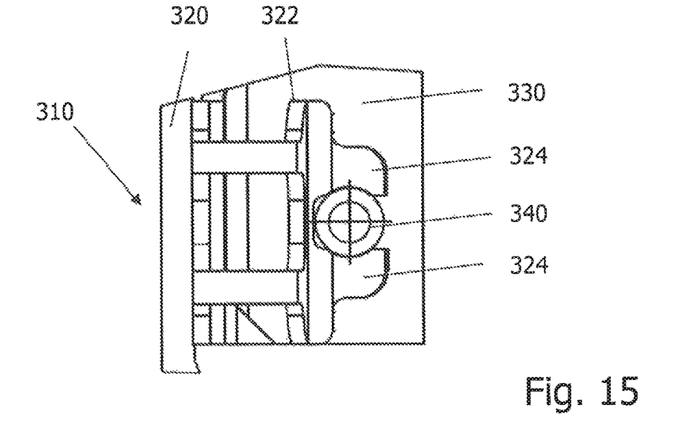
FIG. 15 shows a plan view of the latching connection between the embodiment shown in FIG. 13 and the pad back plate.
Figure 16:
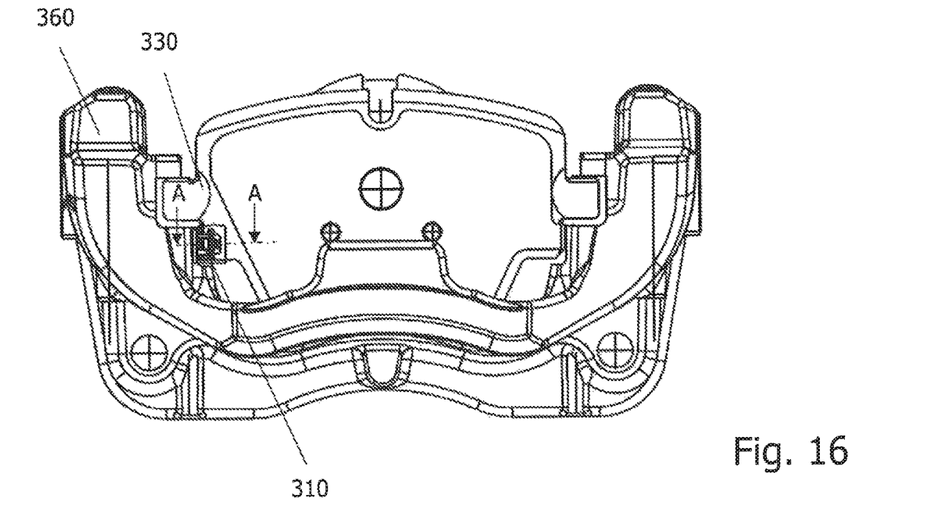
FIG. 16 shows a view of the pad back plate with the embodiment shown in FIG. 13 after installation in a brake carrier.

The other limb of the u-shaped damping element 210 which is arranged on the side facing the damping plate 30 has a latching portion 215 which is bent inwards or in the direction of the bearing surface. On the pad back plate 220 there is provided a latching indentation 223 which is suitable for engagement with the latching portion, as can be seen in FIG. 11. This latching indentation 223 can be formed by a deformation process, such as, for example, by means of a punch which penetrates into the pad back plate 220. In doing so, the material which has accumulated on the opposite side owing to the deformation process can form the protruding positioning bulge 222 which is provided for engaging with the aperture 211. All the other elements illustrated in FIGS. 7 to 12 correspond to the above-described elements and their functions.

A further embodiment is shown in FIGS. 13 to 17. Analogously to the embodiment according to FIGS. 7 to 12, the damping element 310 here engages around the pad back plate 330 below an extension 331 and is positioned by means of a pin-shaped positioning projection 340 and a latching indentation 350. The damping element 310 has a latching portion 312 which engages in the latching indentation 350 via a latching lug 314 and comes to bear in a planar manner on the pad back plate 330. A connecting portion 316 adjoins the latching portion 312 at an angle of more than 90° and merges into a latching limb 318 of u-shaped configuration. This latching limb 318 has a first portion 320, which extends in a manner continuing in the direction of the connecting portion 316 and merges into a second portion 322, which is bent by less than 180° towards the pad back plate 330. The second portion 322 merges substantially at right angles into two engaging limbs 324.

Owing to the above-described geometry of latching portion 312 and connecting portion 316 and also first portion 320 and second portion 322 of the latching limb 318, the engaging limbs 324 initially lie substantially at an angle of more than 0° to the surface of the pad back plate 330 opposite them. In order to enable the engaging limbs 324 to engage with the positioning projection 340, the damping element 310 therefore has to be bent towards the pad back plate 330, and this introduces a biasing force into the damping element 310 and improves the fixing on the pad back plate 330. This is shown clearly by the sectional representation in FIG. 17, which shows a section A-A according to FIG. 16. Here, it can be seen that the portions of the damping element 310 adjoining the latching portion 312 are bent, by means of the engagement of the engaging limbs 324 on the positioning projection 340, substantially towards the pad back plate 330. As a result, a biasing force is introduced into the damping element 310.

The holding of the engaging limbs 324 by the positioning projection 340 can be realised, for example, by a circumferential groove in the positioning projection 340 in which the engaging limbs 324 engage and/or by pushing the engaging limbs 324 onto the positioning projection 340 in an elastically bracing, spreading manner.

Figure 17:
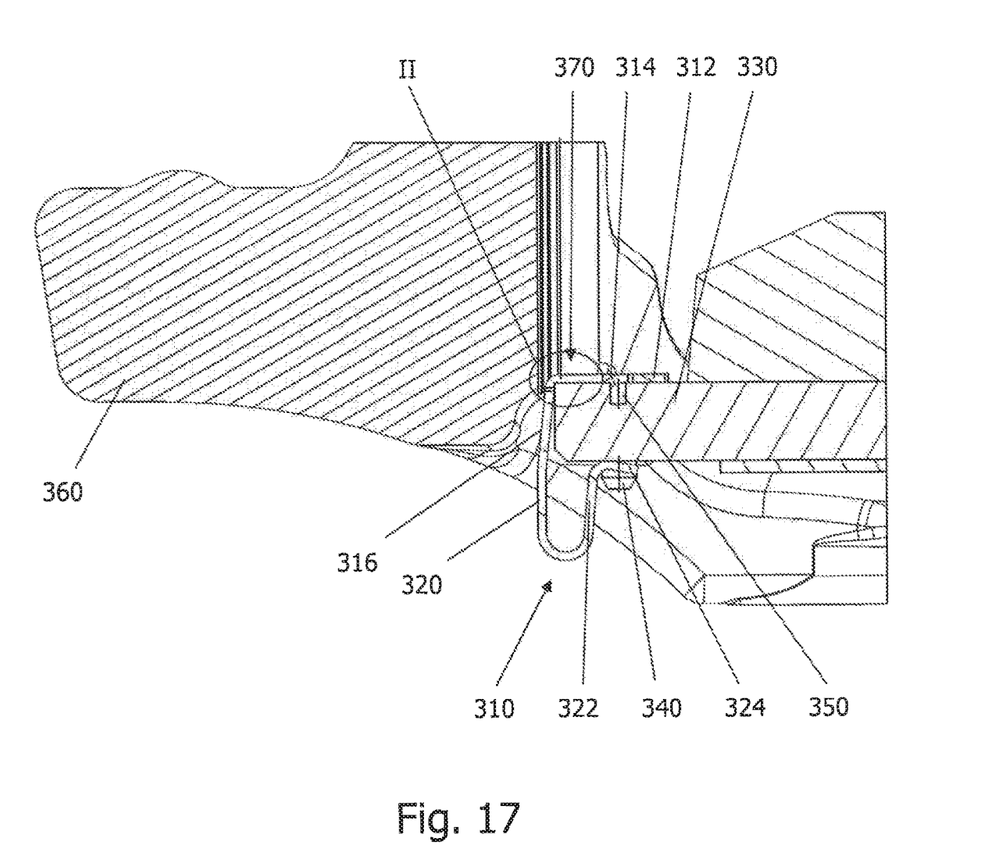
FIG. 17 shows a sectional view of the arrangement according to FIG. 16.

As marked by the region II in FIG. 17, the damping element 310 partially bears against the brake carrier 360 inside a shaft-like recess 370. This applies in particular to the latching portion 312 and also to the connecting region 316. Before installation in the brake carrier 360, the connecting region 316 stands away slightly obliquely from the pad back plate 330. In the region in which the connecting region 316 bears on, the shaft-like recess 370 of the brake carrier 360 is now configured in such a manner that the connecting region 316 or the damping element 310 is deformed in the direction of the pad back plate 330 and thus the biasing of the damping element 310 is increased. This can be realised, for example, by means of a wall in the relevant region of the recess 370 which has a smaller angle to the opposite surface of the pad back plate 330 than the angle at which the connecting portion 316 stands away from the pad back plate 330.

All the other elements illustrated in FIGS. 13 to 17 correspond to the above-described elements and their functions.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

LIST OF REFERENCE SYMBOLS 1 brake pad arrangement
10 damping element
11 bearing surface
12 upper connecting portion
13 lower connecting portion
14 upper holding region
15 lower holding region
16 fastening lug
17 latching lug
18 clamping lug
19 clamping lug
20 pad back plate
21 extension
22 undercut
30 damping plate
40 friction pad
110 damping element
111 supporting arm
210 damping element
211 bearing surface
212 aperture
213 connecting portion
214 clamp portion
215 latching portion
220 pad back plate
221 extension 222 positioning bulge
223 latching indentation
310 damping element
312 latching portion
314 latching lug
316 connecting portion
318 latching limb
320 first portion
322 second portion
324 engaging limb
330 pad back plate
331 extension
340 positioning bulge
350 latching indentation
360 brake carrier
370 recess
500 brake pad arrangement (prior art)
501 pad back plate
502 extension
503 damping plate
504 extension of the damping plate
505 portion
506 bearing surface

The invention claimed is:

1. A brake pad arrangement for a vehicle brake having a friction pad,
a pad back plate having an extension which is adapted to guide the brake pad arrangement in the vehicle brake, and
a damping plate which is arranged on the pad back plate, wherein the brake pad arrangement comprises a separate damping element, which is adapted to damp frictional vibrations of the brake pad arrangement, and the damping element has at least one fixing element which acts on a front side, rear side and/or laterally on the pad back plate, in order to fix the damping element on the pad back plate, the fixing element comprising at least one latching element which is engageable with a correspondingly shaped indentation in the pad back plate, and the damping element being of u-shaped configuration and the damping element being arranged on the pad back plate in such a manner that limbs of the damping element engage around the pad back plate laterally below the extension,
wherein the fixing element has an aperture or engaging limb which is engageable with a positioning projection arranged on the pad back plate, in order to fix and position the damping element on the pad back plate.

2. The brake pad arrangement according to claim 1, wherein the damping element is connected to the pad back plate in such a manner that at least a part of the damping element bears in a manner free from play against the pad back plate.

3. The brake pad arrangement according to claim 1, wherein the damping element is connected to or with the pad back plate via a latching connection, an adhesive-bonding connection and/or with the aid of a biasing force.

4. The brake pad arrangement according to claim 1, wherein the fixing element has a clamping force which is produced owing to elastic deformation of the fixing element and can be exerted on the damping element, in order to fix the damping element on the pad back plate.

5. The brake pad arrangement according to claim 1, wherein the damping element is biased in a state attached to the pad back plate, the damping element being received under vibration-reducing biasing on installation in a brake carrier.

6. The brake pad arrangement according to claim 1, wherein the damping element has a portion or arm which is situated on a side facing the friction pad and is formed in such a manner that, when a wear limit of the friction pad is reached, a striking of a brake disc of the vehicle brake on which the friction pad can act is initiated, thereby resulting in a warning noise indicating a worn friction pad.

7. The brake pad arrangement according to claim 1, wherein damping material is arranged between the damping element and the pad back plate at the contact surface.

8. The brake pad arrangement according to claim 7, wherein the damping material is an adhesive layer.

9. The brake pad arrangement according to claim 1, wherein the damping element is of one part and is produced from bent sheet metal or plastic.

10. A disc brake arrangement for a vehicle system having a brake disc and the brake pad arrangement according to claim 1, the brake pad arrangement being arranged so as to be movable relative to the brake disc in order to act on the brake disc by means of the friction pad.

11. The brake pad arrangement according to claim 1, wherein the limbs of the damping element engage around the pad back plate vertically below the extension.

12. The brake pad arrangement according to claim 1, wherein the damping element comprises engaging limbs disposed adjacent the pad back plate.

13. A brake pad arrangement for a vehicle brake having a friction pad,
a pad back plate having an extension which is adapted to guide the brake pad arrangement in the vehicle brake, and
a damping plate which is arranged on the pad back plate, wherein the brake pad arrangement comprises a separate damping element, which is adapted to damp frictional vibrations of the brake pad arrangement, and the damping element has at least one fixing element which acts on a front side, rear side and/or laterally on the pad back plate, in order to fix the damping element on the pad back plate, the fixing element comprising at least one latching element which is engageable with a correspondingly shaped indentation in the pad back plate, and the damping element being of u-shaped configuration and the damping element being arranged on the pad back plate in such a manner that limbs of the damping element engage around the pad back plate laterally below the extension,
wherein the entire damping element engages around the pad back plate vertically below the extension.

14. A brake pad arrangement for a vehicle brake having a friction pad,
a pad back plate having an extension which is adapted to guide the brake pad arrangement in the vehicle brake, and
a damping plate which is arranged on the pad back plate, wherein the brake pad arrangement comprises a separate damping element, which is adapted to damp frictional vibrations of the brake pad arrangement, and the damping element has at least one fixing element which acts on a front side, rear side and/or laterally on the pad back plate, in order to fix the damping element on the pad back plate, the fixing element comprising at least one latching element which is engageable with a correspondingly shaped indentation in the pad back plate, and the damping element being of u-shaped configuration and the damping element being arranged on the pad back plate in such a manner that limbs of the damping element engage around the pad back plate laterally below the extension,
wherein the extension is a first extension, and the pad back plate has a second extension opposite the first extension and which is also adapted to guide the brake pad arrangement, and, in a direction from the second extension to the first extension, the first extension extends further than the damping element.

* * * * *